Feb. 3, 1970  P. P. SOROKIN  3,493,885
PHOTOBLEACHABLE Q-SPOILER DYE FOR LASER OPERATION
Filed March 9, 1964
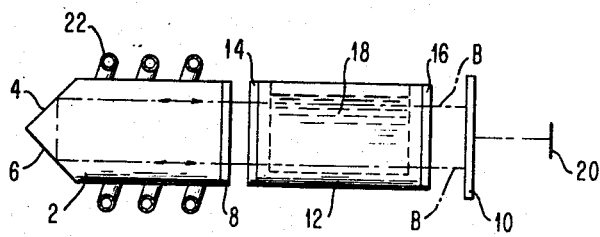
FIG. 1
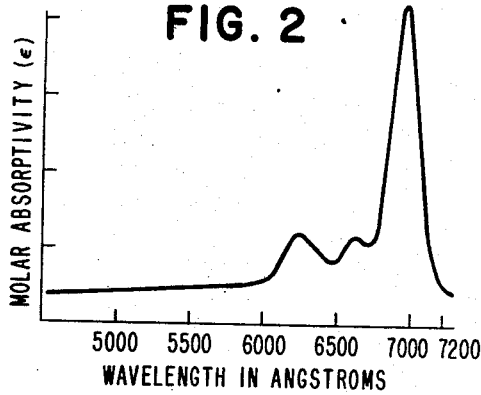
FIG. 2
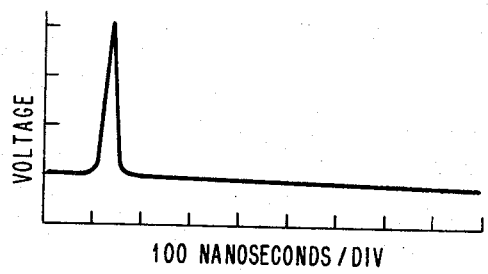
FIG. 3
FIG. 4
INVENTOR.
PETER P. SOROKIN
BY
ATTORNEY 3,493,885
PHOTOBLEACHABLE Q-SPOILER DYE FOR LASER OPERATION
Peter P. Sorokin, Ossining, N.Y., assignor to International Business Machines Corporation, New York, N.Y., a corporation of New York
Filed Mar. 9, 1964, Ser. No. 350,397
Int. Cl. H01s 3/14
U.S. Cl. 331—94.5        6 Claims

ABSTRACT OF THE DISCLOSURE

A photobleachable dye is employed as a non-linear absorber in a laser cavity to act as a Q-spoiling element in such cavity for the production of giant laser pulses. Where ruby laser is used, a particularly effective dye would be the family of metal phthalocyanines, of which a solution of chloro-aluminum phthalocyanine is very effective.

---

This invention relates to the generation of laser beams in general, and more particularly to the generation of "giant" pulse laser beams.

Most solid state optical lasers produce outputs that are erratic. That is, the output energy contained in the laser beam will consist of many spiked outputs wherein hundreds of such spikes appear at intervals of one to three microseconds apart and the total "pulse" lasts for an interval of about five hundred microseconds. It is desirable to obtain a pulsed output of a laser which is very intense, consists of a single spike, and is very short in duration. To obtain such a giant pulse, it is necessary that a laser crystal be highly excited and be pumped to a condition of near total population inversion, and that such excitation be efficiently and rapidly dumped as output power in the form of a single stimulated radiant-emission pulse.

In practice, it has been found that even by pumping energy into the laser that is in excess of the oscillation threshold of the laser, this type of giant pulse or peak power emission is not readily accomplished. The reason for this difficulty may be seen if one considers the following two relationships:

(1)        $dS/dt = NB_c S$ where S is the number of photons in the cavity mode, $B_c$ is a constant, independent of the reflectivity, and N is the excess population in the upper state. The quantity $dS/dt$ is effectively a measure of the growth of power in the laser beam, and (2)        $N/V = K(1-R)$ where K is a constant and R is the reflectivity of the resonant cavity. The latter equation gives the population excess needed at "threshold." For fixed R, $N/V$ cannot be made to exceed the quantity determined by Equation 2, because of the occurrence of stimulated emission. By keeping R low during the pumping process, a relatively high value of $N/V$ can be achieved before instability results. If the reflectivity is then suddenly switched to a high value, stimulated emission will occur, according to Equation 1, at a greatly enhanced rate, since the (exponential) growth of S is a function of $N/V$, and $N/V$ has, in effect, been increased over its "normal" value.

The present invention seeks to obtain this peak power emission of pulsed lasers by employing an organic compound or dye, such as phthalocyanine, from the generic family of metal porphyrins that is interposed between a laser and a high reflectivity reflector. The term "porphyrin" is used to denote all tetrapyrrole compounds in which the rings are linked in a closed conjugate system. This includes the porphyrins, the reduced porphyrins, and the benzoporphyrins. A specific substance, namely, the chloro-aluminum phthalocyanine molecule, diluted in chloronaphthalene, is highly absorptive at the frequency of 6943 A. This frequency coincides with the frequency of light given out by a lasing ruby crystal.

It is therefore an object of this invention to provide an improved optical maser device.

Another object is to provide a generator of a giant pulse laser beam.

A further object is to provide a giant pulse laser requiring very few auxiliary components.

Yet a further object is to provide a giant pulse laser wherein a bleachable chemical is employed to obtain Q-switching of a laser device.

Yet a further object is to obtain an improved laser employing a bleachable chemical for obtaining Q-switching wherein the chemical returns to its initial state after being bleached.

The foregoing and other objects, features and advantages of the invention will be apparent from the following more particular description of a preferred embodiment of the invention as illustrated in the accompanying drawing.

In the drawing:

FIGURE 1 is a schematic diagram of the invention employing a bleachable chemical in a giant pulse generator.

FIGURE 2 is a plot of the absorptivity characteristics of chloro-aluminum phthalocyanine dissolved in chloronaphthalene.

FIGURE 3 is a showing of the characteristics of the output pulse of the giant pulse produced by the system of FIGURE 1.

FIGURE 4 is an energy diagram to aid in an understanding of the behavior of the phthalocyanine from its absorptive period to its bleached state.

A laser crystal 2 is an active medium or negative temperature medium that is formed of aluminum oxide doped with chromium and is generally called a ruby. The ruby 2 is prepared with totally reflective surfaces 4 and 6 at one end and, either an uncoated surface at its other end, or an anti-reflecting coating 8, such anti-reflecting coating being chosen to be highly transmissive to wavelengths of light in the region of 6943 A. Mirror 10 is substantially 99% reflective and is about 1% transmissive, although other values could be used such as, 90% reflective and 10% transmissive, or varying combinations of such values. Interposed between said mirror 10 and ruby crystal 2 is a glass cell 12 whose vertical walls are coated with anti-reflecting coatings 14 and 16 that are similar in function to coating 8. It is noted that such coatings 14 and 16 are optional.

Cell 12 houses a solution 18 of chloro-aluminum phthalocyanine in chloronaphthalene, typically transmitting 50% in a single pass through the cell at low levels at 6943 A. As seen in FIGURE 2, the peak absorption of light by the phthalocyanine is very close to 6943 A., which is the wavelength of light emitted by the ruby crystal when it lases. A film 20, or a photocell connected to an oscilloscope, or any other suitable light detecting device is employed to sense the visible output of the lasing system. Surrounding the ruby crystal 2 is a flash lamp 22 that is connected to a suitable source of power not shown.

In operation, the flash lamp 22 is flashed so that the absorption of energy by the ruby crystal 2 produces a standing wave B—B of light that is reflected between mirror 10 and reflecting faces 4 and 6. The standing wave passes through the organic compound containing cell 12 so that a single beam of light is attenuated twice by the chloro-aluminum phthalocyanine, once when the beam leaves the ruby crystal 2, and again when it is reflected from mirror 10, before re-entering the crystal 2. Assume that the phthalocyanine absorbs about 50% of the initial energy of light beam B—B as it exits from crystal 2 and passes through cell 12 to be reflected by mirror 10; after such reflection, the 50% attenuated beam B—B will again be attenuated by 50% before re-entering the ruby crystal. In effect, anti-reflecting coating 8 may be considered as a virtual reflector of 25% of the light energy in the laser cavity. The large absorption coefficient of the chloro-aluminum phthalocyanine in the vicinity of the ruby laser transition frequency reduces the value of Q and increases the threshold for the onset of laser oscillations.

With a reduced Q, the flash lamp 22 must supply greater pumping energy to the active medium 2 to attain a high population inversion N so as to initiate oscillations. For high power output, it is desirable to have a high initial value of N in order that the giant pulse grow rapidly. The high Q is obtained because phthalocyanine is a non-linear absorber of light and has the property of becoming bleached when exposed to an intense beam of light. As soon as bleaching occurs, the phthalocyanine loses its absorption characteristics and transmits all of the light passing through it, so that surface 8 acts as a 100% virtual reflecting surface instead of a 25% virtual reflecting surface. This bleaching of the phthalocyanine by the laser beam B—B takes place at a time that is short compared with the lifetime of the stimulated radiation in the laser cavity bounded by mirror 10 and reflecting surfaces 4 and 6. Thus Q changes from a value corresponding to a 25% reflectivity to a value corresponding to 100% reflectivity at a time when the population inversion is also relatively very high, so as to produce a high power or "giant" output pulse that can be sensed by film 20.

FIGURE 3 is a plot of output voltage versus time, where the time intervals are 100 nanoseconds/division, of a high speed photograph of the output pulse produced by the device of FIGURE 1. It is seen that there are no multiple spikes in the output light, the energy is concentrated in a single pulse that is 30 nanoseconds wide, and the output pulse is of the high peak power configuration.

The device of FIGURE 1 provides for a change in the absorption characteristics of the dye or absorbing medium in cell 12 by the internal beam of the laser cavity, which change is necessary to obtain a giant pulse output. Moreover, such change is reversible, permitting the phthalocyanine to recover its absorption characteristics so that a subsequent giant pulse can be generated. It is to be noted that the present device requires no external equipment, such as Kerr shutters, rotating mirrors, and the like to obtain the "Q-spoiling" needed to yield a giant pulse. The Q-spoiling is obtained by a liquid that has a very high molar absorptivity at the ruby frequency. Moreover, there is no need for external synchronization of auxiliary equipment to obtain Q-spoiling. The use of a recoverable highly absorptive bleachable material greatly simplifies the equipment needed to obtain giant pulses.

When the transition frequency of the lasing crystal 2 or similar lasing active medium is different than 6943 A., a bleachable non-linear absorber other than chloro-aluminum phthalocyanine or the porphyrins will be contained in cell 12. The choice of bleachable substance will be made so that its absorption spectrum matches the emission spectrum of the lasing medium. Such bleachable substance need not necessarily be a liquid, but could be a solid or a gas, so long as the bleachable substance is recoverable and reusable, permitting the repeated generation of giant pulses.

FIGURE 4 is a diagram of energy levels of active porphyrin molecules and serves as an aid in describing the operation of the effect of the laser light on such molecules. In general, such laser light causes a redistribution of the molecules of the active porphyrin in different energy levels so that absorption of the porphyrin is diminished without destroying the molecules. The manner of how such redistribution takes place is not fully understood but it is believed that the following takes place.

Metal porphyrins (including the free base) dissolved in liquid organic solvents, such as, though not limited to, nitrobenzene and chloronaphthalene, were chosen to act as Q-switches or "Q-spoiling" elements because they demonstrated enough bleachable absorber action at $\lambda=6943$ A. and could be repeatedly used in pulsed ruby laser operations.

The absorption spectrum for a metal porphyrin in solution is characterized by intense band groups in the red and near ultra-violet regions of the electromagnetic spectrum. These band groups correspond to highly allowed electronic (singlet-singled) transitions of the porphyrin ring. For the phthalocyannines, the main absorption band occurs in the visible red portion of the spectrum. As seen in FIGURE 4, this absorption results from transitions occurring between the lowest vibration level of the ground state S and the lowest vibration level of the first excited singlet state S'. The molar absorptivity at the peak of the band between S and S' is exceedingly high.

In general, the metal ion occupying the center of the phthalocyanine, or the more general porphyrin, molecule influences the basic absorption and fluoroescence spectrum in two ways. Firstly, it affects the exact location of the absorption peaks. For example, if dilithium phthalocyanine is diluted in chloronaphthalene, the main absorption peak is 6560 A. Vanadium phthalocyanine diluted in chloronaphthalene has an absorption peak at about 6980 A. The second effect of the central metal ion is to influence the ratio of $k_{S'S}/k_{S'T}$, the latter being the rate constant $k$ for fluorescent decay from the excited singlet state S' to the ground state S divided by the rate constant K for non-radiative decay from state S' to a metastable triplet state T. On theoretical grounds, it is to be expected that the dilithium compound of phthalocyanine will have a bright fluorescence (a high ratio of $k_{S'S}/k_{S'T}$), less fluorescence for the chloro-aluminum compound, still less for the free base compound, and none for the vanadium compound. The energy difference between the ground state S and the first excited singlet state S' in FIGURE 4 is about 14,400 cm.$^{-1}$ in the case of chloro-aluminum dissolved in chloronaphthalene, which matches the frequency output of the ruby laser.

The bleaching experienced by the non-linear absorber 18 results mainly from saturation of the singlet-singlet transition. There exists the estimate $k_{S'T} \approx 1.3 \times 10^7$ sec.$^{-1}$ in the case of Mg phthalocyanine. Taking this value, and assuming a concentration of phthalocyanine molecules $n_0$ to be equal to $2 \times 10^{14}$ per cc. immediately after a 10 nanosecond giant pulse, about 7% of all the molecules of the phthalocyanine compound should be in the triplet state T. Thus, it is likely that the role played by the triplet state absorption is probably only important in absorption experiments lasting for a longer interval of time than is needed to produce a "giant" pulse from a ruby laser. Theoretically, there should be some absorption by the phthalocyanine molecules in the lowest triplet state T to some excited triplet states T'. It has been found in the case of Mg phthalocyanine molecules that at the wavelength corresponding to the peak red absorption from the ground state, the absorption from the triplet state is considerably less. Thus, in principle, bleachable absorber action could result from a significant portion of the molecules occupying the triplet state T. The time of the giant pulse is so short that the triplet state population achieved during such giant pulse is negligible. The triplet state absorption does not play a very important role in the actual bleaching involved in a giant pulse.

While the invention has been particularly shown and described with reference to a preferred embodiment thereof, it will be understood by those skilled in the art that various changes in form and details may be made therein

What is claimed is:

1. In a laser system for producing a giant pulse output comprising a resonant cavity formed by a ruby crystal as its active medium and two reflecting elements on either side of said crystal, one of said elements being partially light-transmitting, a solution of chloro-aluminum phthalocyanine interposed between said ruby crystal and one of said reflecting elements, the high molar absorptivity of said solution at the ruby frequency and its bleachable characteristics permitting said solution to serve as a Q-spoiler in said resonant cavity.

2. In a laser system for producing a giant pulse output comprising a resonant cavity formed by a ruby crystal as its active medium and two reflecting elements on either side of said crystal, one of said elements being partially light-transmitting, a metal porphyrin compound interposed between said ruby crystal and one of said reflecting elements, means for pumping said crystal and said compound, the high molar absorptivity of said compound at the ruby frequency and its bleachable characteristics permitting said compound to serve as a Q-spoiler element in said resonant cavity.

3. In a laser comprising a resonant cavity formed by an active medium having two end surfaces and a reflecting element at each surface, means for applying pumping energy to said active medium to initiate light oscillations in said resonant cavity, and a non-destructive photobleaching organic dye interposed between said active medium and one of said reflecting elements, said organic dye having a high molar absorptivity at the frequency of the active medium.

4. In a laser comprising a resonant cavity formed by an active medium and two reflecting surfaces, an organic dye in solution interposed between the active medium and one of its reflective surfaces, said organic dye solution having a relatively low transmission in its quiescent state at the laser frequency of the active medium and capable of non-destructive bleaching at this frequency.

5. In an optical laser comprising a resonant cavity formed by an active medium and two reflecting surfaces, an organic dye interposed between the active medium and one of its reflecting surfaces, said organic dye having a relatively low transmission in its quiescent state at the laser frequency of the active medium and capable of non-destructive bleaching at this frequency to cause the laser to emit a giant pulse.

6. The optical laser of claim 4 wherein said active medium is a ruby crystal and said organic dye solution is a metal porphyrin in an organic solvent.

References Cited

UNITED STATES PATENTS

| | | | |
|---|---|---|---|
| 3,270,291 | 8/1966 | Kosonocky | 331—94.5 |
| 3,289,099 | 11/1966 | Masters | 331—94.5 |
| 3,365,678 | 1/1968 | Maurer | 331—94.5 |

JEWELL H. PEDERSEN, Primary Examiner

WILLIAM L. SIKES, Assistant Examiner

U.S. Cl. X.R.

350—160